Figure 1:
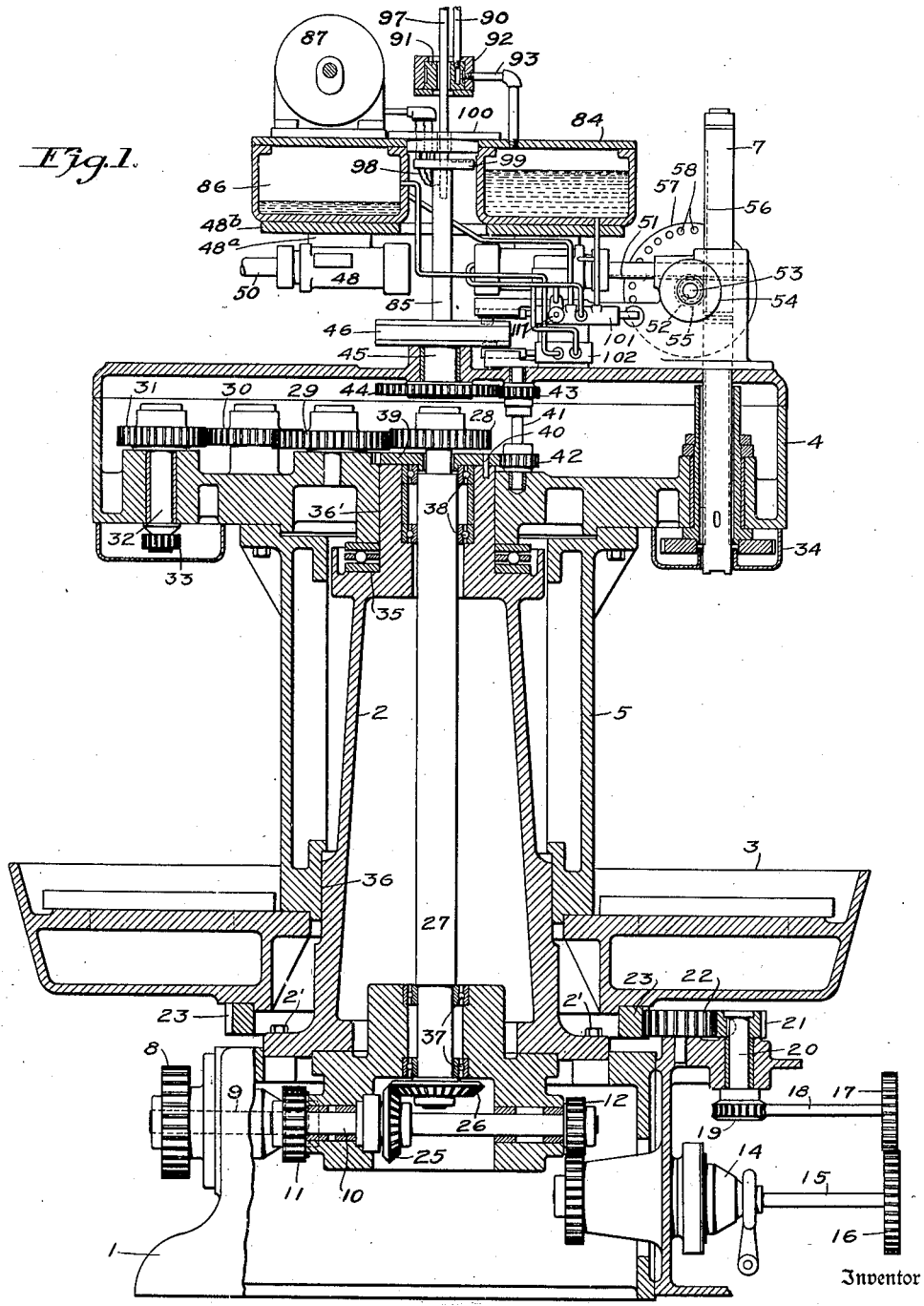

Sept. 8, 1931.  A. L. DE LEEUW  1,822,691
FLUID PRESSURE OPERATED CONTINUOUS ROTARY MACHINE
Original Filed Dec. 7, 1926   4 Sheets-Sheet 2

Inventor
Adolph L. De Leeuw
By Nathan & Bowman
Attorney

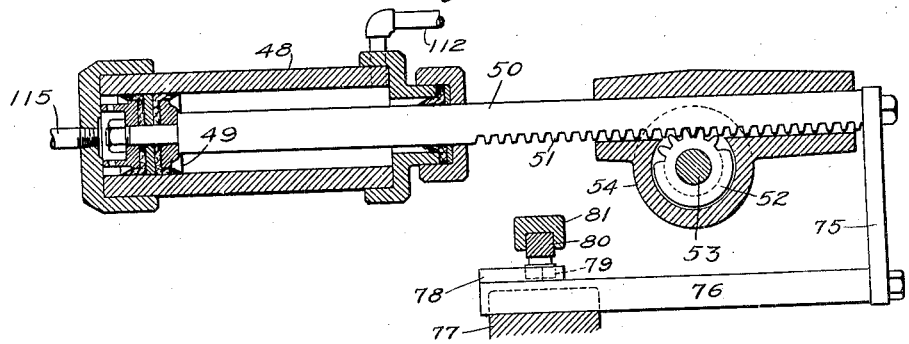
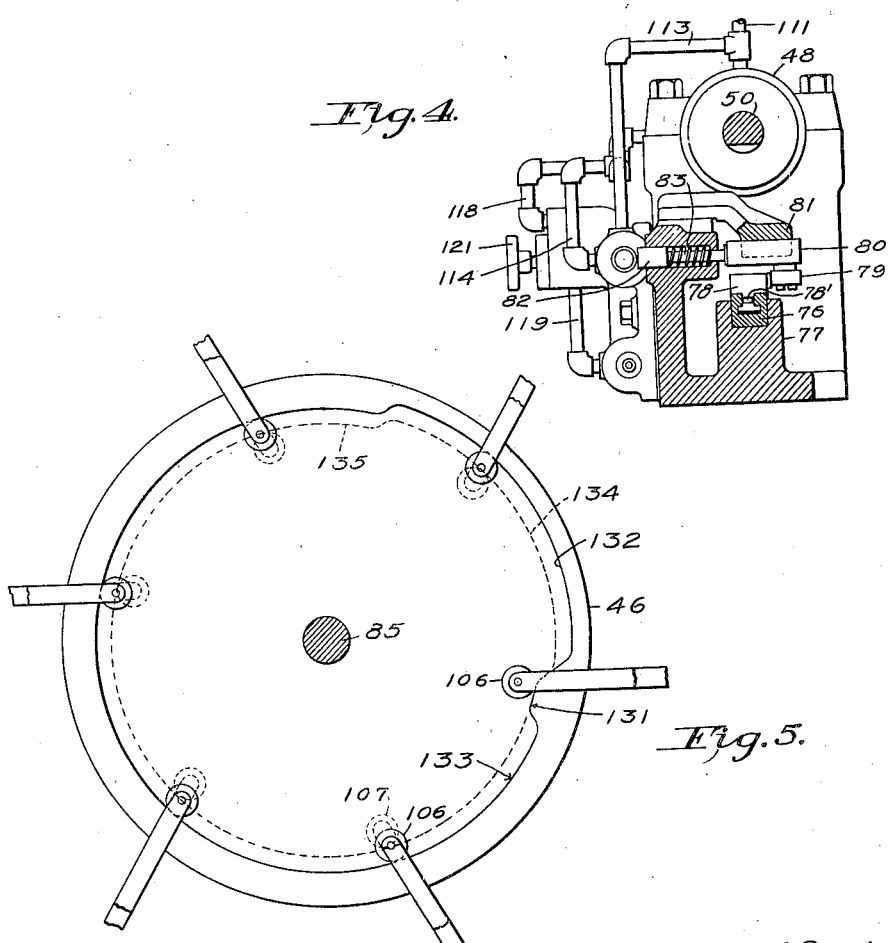

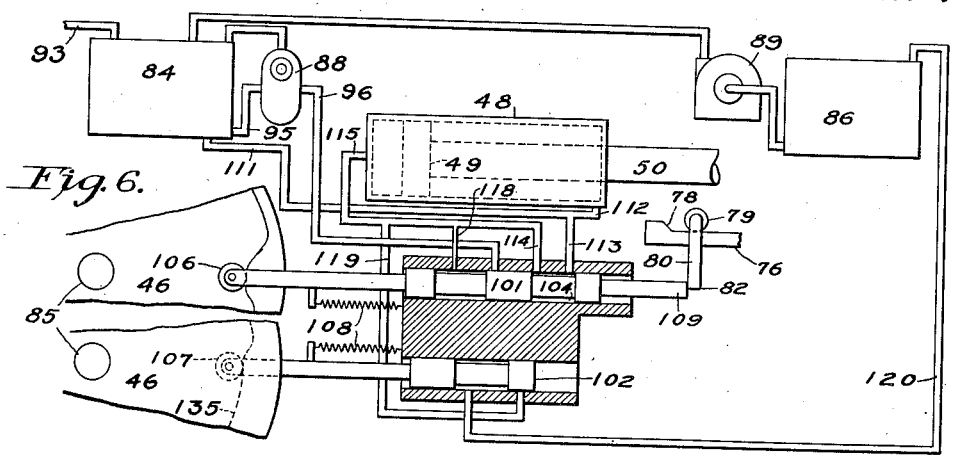
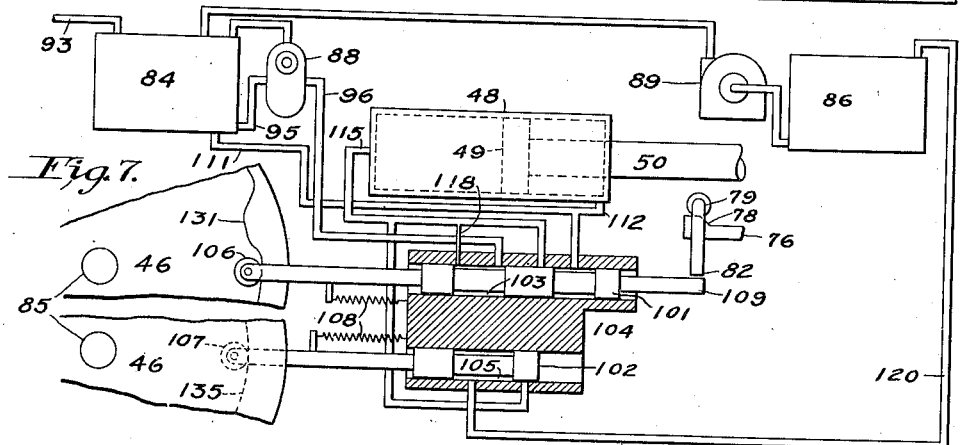
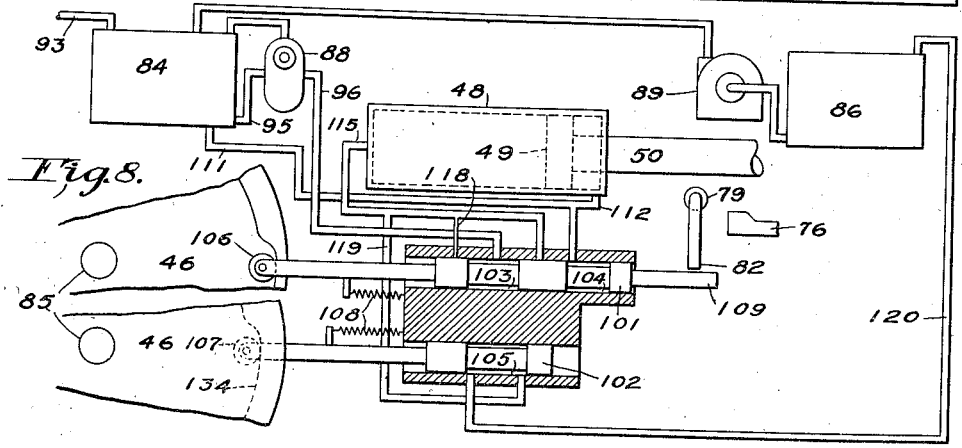

Patented Sept. 8, 1931

1,822,691

UNITED STATES PATENT OFFICE

ADOLPH L. DE LEEUW, OF PLAINFIELD, NEW JERSEY

FLUID PRESSURE OPERATED CONTINUOUS ROTARY MACHINE

Original application filed December 7, 1926, Serial No. 153,177. Divided and this application filed May 11, 1928. Serial No. 276,846.

The invention disclosed herein relates to improvements in machine tools and as specifically illustrated herein, of the type commonly known as continuous rotary machines. The subject matter of this invention is described and illustrated in a copending application Serial No. 153,177 filed December 7, 1926, of which this is a divisional application. The present invention is concerned particularly with the novel structure and arrangement of the elements of a machine of this general type comprising an adaption and the incorporation therein of a hydraulic system for translation of the working spindles.

A common construction of a machine of this type usually comprises broadly a large rotary head supported on a vertical column and adapted to rotate continuously but slowly thereon. The head carries with it a plurality of rotatable spindles adapted also to receive a vertical movement relative to the head as it rotates. A work table is designed to rotate with the head and to carry stock thereon so positioned as to be acted on by the respective tools. A series of operations may be automatically performed on each piece of stock in order so that upon a complete rotation of the head and table the machining operation is complete. The rotation is slow and usually does not necessitate stopping of the machine for changing the stock as the spindles slowly revolve before the workman.

Many of the advantages of fluid pressure operating means are well known and such means have been variously applied to the translation of drill spindles, lathe head, rotary turrets, and other like machine elements wherein the steady, strong, smooth movement derived from the application of fluid pressure to a movable element aids greatly in obtaining the accuracy and refinements characteristic of a modern machine.

The general characteristics of a large rotary machine differ to a large extent, however, from those of the above mentioned machines and the problems obtaining are not those which are commonly encountered in such prior adaptations of hydraulic means.

In the present type of machine since the working spindles not only rotate but also revolve about a central column then the hydraulic actuating means must also revolve therewith. During this movement, however, a pressure fluid must be continuously supplied or exhausted, and further, since it is necessary that a certain cycle of translatory movements occur without attention from the operator, a reliable and accurate fluid control means must be provided.

The herein described invention discloses such a construction and arrangement of the elements of a rotary machine as to meet in a very practical manner the difficulties and problems peculiar to a machine of that type and to result in a tool of that type possessing the advantages inherent in hydraulic propulsion. The many features contributing to these general objects are described hereinafter and wherein will be revealed other and more specific objects and novel arrangements of elements. Among these is to be noted the arrangement of hydraulic actuating cylinders which are horizontally positioned about the central column with the inner ends of their axes extending adjacent thereto and having suitable operating connections at their outer ends for translating the vertical spindles. The result is a very compact organization with the center of mass at a much lower point than would be obtained e. g., if the hydraulic cylinders were vertically positioned at the upper end of the spindles.

Such an arrangement is further advantageous in that it permits of a unitary central control of simplified nature including a continuous cam engaged by and constituting a direct valve actuating means of comparatively few parts.

The novel application of the fluid means to the type of machine shown herein includes and has for its objects an arrangement whereby the machine is a complete power plant in itself. The only power applied is an inlet for an elastic fluid and a connection to a source of electric current. The fluid circulating means includes two pumps for circulating a hydraulic fluid at different pressures. These pumps are driven by an electric motor. Two reservoirs are provided for the liquid and gaseous fluids. All of these parts are mounted on the head in close proximity to the individual fluid motion for actuating the spindles. A simple, complete hydraulic actuating system is thus carried by the rotating head, practically independent of external pumps and such devices.

The objects also include the provision, in conjunction with the head having the various elements thereon which have been outlined of a supporting structure therefor designed to carry the unusual vertical and horizontal loads in a very efficient manner and at the same time provide a rigid supporting structure for the gearing for rotating the table and spindles. The elements are compactly and symmetrically arranged to result in a smooth well balanced machine tool.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
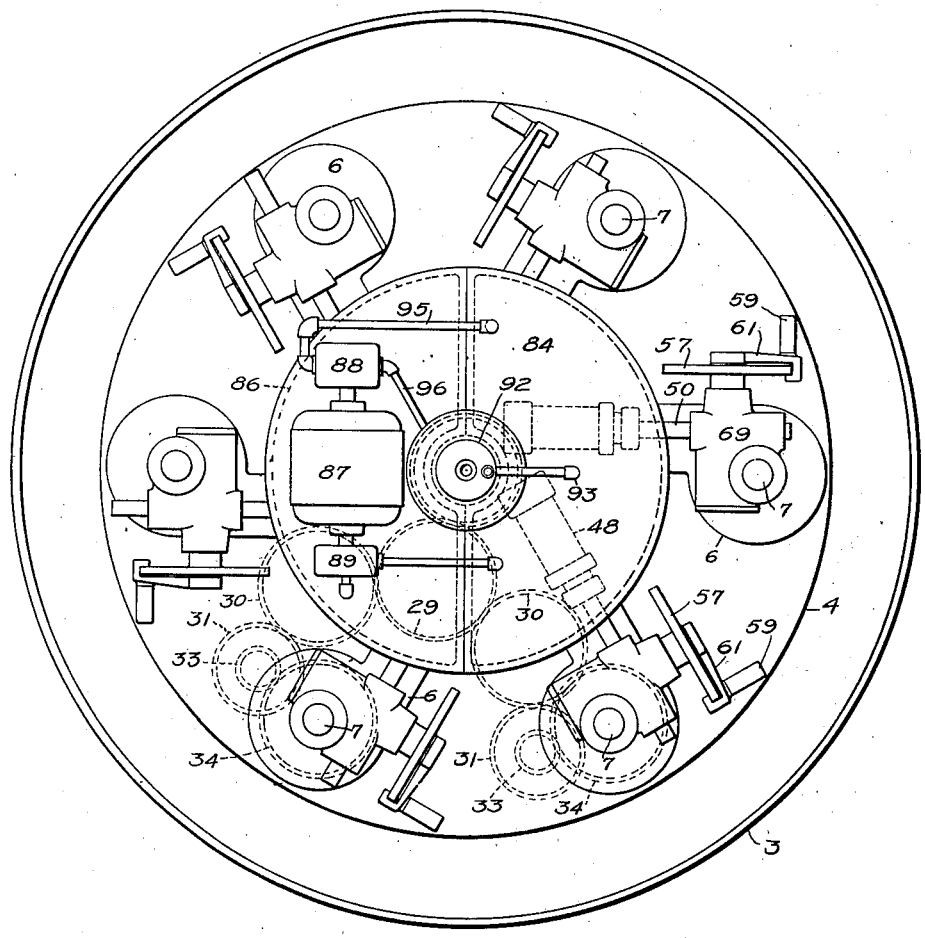

Figure 1 is a vertical view chiefly in section of a continuous rotary machine tool. Fig. 2 is a plan view thereof showing the symmetrical arrangement of the several units thereon. Fig 3 is a detail view of the fluid pressure cylinder showing the rack means and other actuating members rigidly connected to the differential piston. Fig. 4 is a view taken from the right of Fig. 3 but with the addition thereto of control means for the admission of fluid to the cylinder. Fig. 5 is a detached view of the cam adapted to control the actuation of the control means. Fig. 6 is a diagrammatic view of the fluid system with the valves positioned so as to give the tool its rapid forward traverse. Fig. 7 is a similar view but with the valve means positioned to give the slow working stroke and Fig. 8 shows the valves in the position occupied for quick return traverse.

The machine specifically disclosed herein is what may be generally termed a continuous rotary machine tool and the general features of which are a base 1 having rigid therewith a vertical supporting column 2 held thereon by the bolts 2' around which rotates the work table 3 and the supporting head 4. The work table and supporting head are rigidly connected to rotate together by means of a cylindrically shaped member 5.

The head 4 is adapted to carry the individual power units 6, each of which actuates a spindle 7 which is also rotatable and adapted to engage the stock which is placed on the work table 3. Six of these units symmetrically arranged on the head are shown but the number may be varied in accordance with the requirements of the work.

The normal operation of such a machine as is herein disclosed consists generally of a rotary motion of the head and work table which is continuous and during which rotation the spindles 7 carrying tools are moved vertically whereby the tools engage the work which is fastened by any suitable means on the table 3. The movements of the spindle are controlled by the mechanism to be described more in detail so that the tool performs its operation on the stock during one complete revolution of the machine.

The means for rotating the members described comprises a gear 8 mounted on a stub shaft 9 and adapted to have power applied thereto from any suitable source. The rotation of shaft 9 is transferred to shaft 10 by suitable gearing 11. Mounted on shaft 10 is the gear 12 for engagement with the gear 13 mounted on a third shaft. At 14 is shown a clutch for selectively connecting the shaft 15 to be rotated thereby. 16 and 17 are change gears for causing the rotation of the shaft 18 and through the worm gearing 19 the vertical stub shaft 20.

Keyed on the stub shaft 20 is the gear 21 engaging with the gear 22 which in turn engages with the large bull wheel 23 rigidly connected to the rotatable head and table.

The means for rotating the various individual spindles 7 comprises a bevel gear 25 mounted on the shaft 10 to be rotated thereby and meshing with the bevel gear 26 rigidly mounted on the central shaft 27 which has at its upper end the central gear 28 for imparting rotation to the individual spindles. Such rotation is accomplished by the chain gearing comprising gears 29, 30 and 31. The gear 31 is mounted on a stub shaft 32 having at its lower end a small gear 33 for engagement with the gear 34 mounted on the spindle 7. The spindle 7 is splined in the gear 34 thereby permitting vertical reciprocation of the spindle without interrupting the rotation thereof by the gearing described. Reference to Fig. 2 shows that the gear 29 simultaneously engages with two gears 30 thus reducing the number of gears required.

As shown in Fig. 1 the vertical weight of the rotary members is carried by the thrust bearing 35. The central column 2 also has the large bearing surfaces 36 and 36' to receive lateral forces and accurately position the heavy rotary structure. Bearings 37 and 38 are provided at the respective ends of the central vertical shaft 27.

Mounted on the central supporting column 2 in a horizontal manner is the stationary gear 39 held against rotation thereon by the pin 40. At 41 is shown a rotary shaft adapted to revolve around the fixed gear 39. The shaft 41 has rigidly mounted thereon gear 13

42 for engagement with the gear 39 and the gear 43 for engagement with the gear 44. The gears 39 and 44 are of the same size as also are the gears 42 and 43. Hence as the shaft 41 revolves around the gear 49 and receives rotation therefrom the speed of the gear 43 will be such as to maintain the speed of the gear 44 the same as that of 39 or in other words in the arrangement shown, the gear 44 will remain stationary.

The gear 44 is rigidly mounted on a shaft 45 having also mounted thereon the double cam 46 which by the arrangement shown is adapted to remain stationary as the head revolves for a purpose to be later disclosed.

The hydraulic actuating means for the spindles includes series of cylinders 48 secured by a bracket 48ª to the under side of the large platform plate 48ᵇ. The cylinders are positioned horizontally and as shown substantially tangential to the cam plate 46. The angularity of the cylinders may be varied however, to suit the particular conditions obtaining. The units are all alike the elements of each including the cylinder 48 having therein the differential piston 49 adapted to actuate the piston rod 50 having thereon rack teeth 51 engaging the rack gear 52 rotatable with the shaft 53 mounted for rotation in the housing 54.

A gear 55 is likewise normally rotatable with the shaft 53 and meshes with a rack 56 on the spindle 7. At 57 is shown an index plate having a series of holes 58 therein adapted to be selectively engaged by a pin in the handle 59 secured to the crank 60. The index plate and associated elements constitute a means for adjusting the spindle 7 relative to the piston shaft 50 whereby the extreme positions of the spindle 7 may be varied without changing the range of translation of the spindle. The novel features of this arrangement are not included in the claims of the present application and therefore the brief description noted is deemed sufficient the details thereof being more fully described in the aforementioned application Serial No. 153,177.

Connected to the outer end of the rack 51 is a bracket 75 which in turn is connected to a reciprocatory member 76 having a sliding support in the member 77. The member 76 has supported thereon and rigid therewith a cam 78 adapted to engage with a roller 79 and which roller is mounted on a slide member 80 mounted for reciprocation in the bracket 81. The cam 78 is adjustable along the member 76 by means of set screw 78'. The bar 80 carries at its outer end a latch 82 adapted to engage with one of the valve stems for a purpose to be later described. The latch 82 is normally held in an outer position by means of the compression spring 83.

The means for supplying fluid pressure to the various cylinders will now be described in detail: Such means as shown in Figs. 1 and 2 are also mounted on the head 4 for rotation therewith. This means comprises primarily a reservoir 84 and a tank 86. The stationary cam 46 hereinbefore referred to has extending from its upper surface a shaft 85 which like cam 46 remains stationary during the revolution of the units. At the upper end of the shaft 85 are shown connections for bringing in electrical current to be described more in detail.

Mounted on the reservoir 86 is an electric motor 87 adapted to drive the high pressure liquid pump 88 and the low pressure pump 89. The reservoir 84 is adapted to be maintained under a constant pressure by admission thereto of an elastic fluid which is admitted through the pipe 90 to the stationary cylindrical member 91. The cylindrical member 91 has surrounding it a rotary cylinder 92 through which is connected the pipe 93 for leading elastic fluid to the reservoir 84. An annular groove on the exterior of the stationary member 91 provides means for admitting such fluid to the pipe 93.

The elastic fluid admitted through 90 to the reservoir 84 may be any elastic fluid found convenient but ordinarily would be connected to the compressed air line such as is found in most manufacturing plants. The pressure of the fluid in the reservoir 84 is intended normally to be comparatively low.

The reservoir is connected directly to the end of the cylinder having the smaller piston face therein. Pressure is intermittently applied from the reservoir to the opposite end of the cylinder against the larger face of said piston whereby the piston is forced to the right and returned to the left by the constant pressure acting on the smaller piston face when the pressure is relieved from the left end of the cylinder. Additional means are shown for supplying high pressure fluid to the left end of the cylinder, such means comprising the high pressure pump 88 heretofore mentioned which takes fluid from the tank 84 through the pipe 95 and supplies said fluid through the pipe 96 which has branches leading to the various units. The fluid furnished by this pump is of a very much higher pressure than that supplied directly to the units from the reservoir 84 and for the purpose principally of carrying the tool through its working stroke after the tool has been brought into engagement therewith by the low pressure means referred to.

As shown in Fig. 1, the electric current is led to the motor 87 by the following means: Concentric with the shaft 45 and extending from the upper surface of the cam 46 may be seen the shaft 85 which will be rigid with the cam 46 and remain stationary. At the upper end of the shaft 85 is a conduit 97 for bringing in electrical current which passes therethrough and is led out as shown at 98 to the stationary distributor plate 99. The rotary plate 100 has brushes thereon engaging with the distributor plate 99 and the current is led therethrough into the motor 87.

The valve control means comprises two main valves 101 and 102, the former constituting the admission valve and the latter the exhaust valve. The valve 101 has fixed on its stem three piston members so spaced as to form the annular grooves 103 and 104. The valve member 102 has two piston members thereon thereby forming the annular opening 105. The valve 101 has at its inner end a roller 106 pivoted thereon to engage with the cam surface on the upper part of the cam 46. In a similar manner the roller 107 attached to valve 102 engages a cam surface on the lower side of the cam 46. These valves are normally urged to the right against the cam surfaces by means of the tension springs 108. The valve 101 has projecting from its outer or right end a latch member 109 adapted at certain times to be engaged by the slide 82 hereinbefore referred to.

The fluid connections comprise a pipe 111 which leads from the reservoir 84 and by means of the connection 112 is in constant communication with the right end of the cylinder 48 whereby it acts constantly on the smaller piston face therein. This pipe 111 has a branch 113 leading to the valve 101. For certain positions of the valve to be described later, the fluid flows therethrough, through the valve 101, pipe 114, and pipe 115 into the left end of the power cylinder. The pipe 96 leads from the high pressure pump 88. Liquid therefrom flows through the main valve 101 and a regulating valve 117 to be described more in detail; then through pipe 118 and into the pipe 115 whereby high pressure fluid is furnished to the left end of the cylinder at a certain time depending upon the valve position. Exhaust from the left end of the cylinder takes place through the pipe 119 leading from the pipe 115 into the valve 102 through the annular groove 105 and out the fluid pipe 120 to the sump 86.

The regulating valve 117, illustrated diagrammatically in Figs. 6, 7 and 8 as the restricted pipe 118, is adapted to be manually adjusted to vary the effective opening by means of the hand grip 121. A specially constructed type of regulating valve has been found best adapted for the functions to be performed but such specific construction does not form a part of the invention claimed herein and the valve may be sufficiently designated for the purposes of the present application as an adjustable opening regulating valve.

The stationary cam carrying member 46 is shown more in detail in Fig. 5 which is a view looking down thereon. The path of the roller thereon comprises a high cam portion 131 for setting the valve 101 to the position shown in Fig. 6, a cut-in portion 132 and the longer cam surface 133. The under surface of the cam plate 46 is provided with cam surfaces 134 and 135 similar to the cam surfaces 132 and 133 on the upper surface. The cam surfaces on the lower side as well as the corresponding positions of the roller 107 are shown in Figs. 5 and 6 to 8 by dotted lines.

The operation of the fluid pressure actuating means can be more clearly understood by referring to the diagrammatic Figs. 6, 7 and 8 which illustrate the three major positions of the valves. In. Fig. 6 the cylinder shown therein with its accompanying valve control means has just been rotated into the position whereby cam surface 131 has moved the valve 101 into the farthest position to the left at which time the latch 82, which has been held back by the projection 109 of the valve 101, is released and jumps out in the path of the projection 109 holding the valve in the position shown in Fig. 4. In this position low pressure fluid flows from the reservoir 84 through the annular groove 104 in the upper valve and through pipes 114 and 115 into the left end of the power cylinder. Owing to the differential surfaces of the piston exposed therein the piston is caused to move rapidly to the right which is the rapid traverse down to bring the tool into engagement with the work. At a proper time the cam surface 78 connected to move with the piston engages the roller 79 to move the slide 80 releasing the projecting end 109 of the valve 101 whereby the valve is urged by spring 108 to the right. Since the cam 78 is adjustable along the member 76 this operation can take place whenever desired. Cam 131 at this time has moved out of engagement with the roller 106.

The valves are now so positioned that the fluid from the high pressure pump is led through the valve through the annular groove 103 into the left end of the cylinder for moving the piston on its working stroke, the speed of this stroke being controlled by means of the regulating valve 117 positioned in the pipe line 118 as shown in the main Figure 1 but for reasons of making the diagrams more simple not shown in the diagrammatic view. As shown in Fig. 7 the connection for leading low pressure fluid to the left end of the cylinder is now closed off by means of the middle piston on the stem of the valve 101.

Fig. 8 illustrates the position for the quick traverse return. In Figs. 6 and 7 as may be seen the valve 102 has occupied a position to the left being held in such a position by the cam surface 135. However as shown in Fig. 8 this valve is now released whereby it is moved to the right permitting communication between the pipe 119 leading from the left end of the power cylinder and the pipe 120 whereby exhaust takes place into the sump 86.

The piston is now moving to the left and carrying with it the cam 78 for moving to the position shown in Fig. 6.

As most clearly shown in the diagrammatic views a system has been provided for furnishing a fluid to a power piston at different rates and different pressures during the same stroke. The low pressure pump 89 is designed to return the fluid from the sump to the reservoir 84 at a rapid rate but at a relatively low pressure, such pressure being roughly 40 lbs. per square inch. The pump 89 may be any desirable type for furnishing a large volume of fluid such as an ordinary centrifugal pump. The pump 88 must be a pump capable of supplying liquid at a very high pressure. However, the volume of fluid furnished by this pump is exceedingly small as compared with the low pressure pump 89. The high pressure pump as has been shown only furnishes fluid during the working stroke which in normal operation is but a very small portion of the total movement of the piston. Also the working stroke would be relatively slow as compared with the quick traverse forward and quick return traverse. The high pressure pump may be of any known type such as a gear pump designed to furnish high pressures.

As may be evident if it were not for the two systems that is the low and high pressures shown herein a pump or some other means would have to be supplied for furnishing fluid at the maximum pressure as well as the maximum rate. The high pressure fluid would often be 1,000 lbs. per square inch or even higher in certain types of machines. Hence it would be an extremely wasteful method to furnish the fluid for moving the piston on its quick traverse at the unnecessary high pressure required during the working stroke.

The advantages and saving which might be accomplished in any single machine are multiplied several times in a machine of the type shown herein. The fluid required to be furnished for a single unit machine would probably be several gallons per minute. Since the major portion of this is furnished at a comparatively low pressure, an enormous saving is accomplished even in the actuation of a single unit, this being multiplied six-fold in the continuous rotary machine shown herein.

The whole fluid system is mounted in a very compact and a substantial manner on the upper part of the head, such comprising a complete hydraulic system practically independent of exterior pumps and power means except for the connection to the air pressure line or other elastic fluid and the lead-in for the electrical current.

The radial arrangement of the cylinders and the general relation of the associated elements results in a very compact well balanced organization with the weight brought closer to the central axis and at as low a point vertically as possible. The control means being centrally mounted and of a unitary construction is much simplified and positive and reliable in its action.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A machine tool combining a supporting column; a head rotatably mounted thereon; a machine element mounted on said head and adapted to be translated relative thereto; a fluid motor mounted on said head for causing translation of said element; a stationary gear mounted on the column; cam means mounted on said head for rotation relative thereto; control means for said motor adapted to contact with said cam means as the head rotates; and mechanism carried by said head and connecting said gear with said cam means whereby the cam is maintained stationary while the head and control means rotate thereabout and the fluid motor is caused to actuate said element.

2. In a machine tool, a supporting column; a head mounted for rotation thereon; a machine element adapted to carry a working tool mounted on said head for translation relative thereto; a fluid pressure actuating motor therefor carried by said head; a member having cam surfaces centrally mounted on said head; means for holding said cam member stationary as the head rotates; and inlet and exhaust valves for said motor mounted on said head and having members connected to the valves adapted to contact with said stationary cam surfaces whereby said motor is caused to actuate said machine element as the head rotates.

3. A machine tool combining a central stationary column; a reduced cylindrical portion at the upper end thereof and forming an annular shoulder adapted to serve as a bearing for vertical loads; a cylindrical member; a head supported at the upper end thereof; a laterally projecting work table at the lower end of said member, the cylindrical member, head and table being rigidly connected together and mounted to rotate on said column, said reduced portion and shoulder forming bearings for said rotary members; a plurality of spindles mounted on said head to revolve therewith; fluid pressure means mounted on said head to rotate therewith for translating said spindles; a stationary gear mounted on the upper end of said reduced portion; a gear mounted in said head; mechanism connecting said two gears whereby the latter is maintained stationary while the head rotates; control means for said fluid pressure means; and means fixed to the gear in the head for actuating said control means as the head rotates.

4. A machine tool combining support; a head mounted for rotation thereon; a spindle carried by said head; fluid pressure means carried by said head for translating said spindle; valve means therefor movable to successive positions to control the operative cycle of said means and thereby the movement of the spindle; cam means operative in accordance with the rotation of said head for controlling the initial position of said valve means; and means operative in accordance with the translation of the spindle for controlling succeeding positions of the valve means.

5. A continuous rotary machine tool combining a support; a head mounted for continuous rotation thereon; a member carried by said head and adapted to be operated through a cycle of translatory movements; and means carried entirely by said head for translating said member comprising a hydraulic motor, a low pressure hydraulic fluid supply means, a pump for supplying high pressure hydraulic fluid, means operated in timed relation with the rotation of said head to admit said low pressure hydraulic fluid for the initial translation of said member, and means subsequently operated in accordance with the translation of said member to control the admission of said high pressure hydraulic fluid.

6. A machine tool combining a support; a head mounted for rotation thereon; a spindle translatably carried by said head; a hydraulic motor for translating said spindle; control valve means for said motor; cam means for moving said valve means to an initial position, said valve means being rotatable with said head and relative to said cam means whereby said initial position is accomplished in timed relation with the rotation of said head; impositive means for urging said valve means from said initial position; interference means for restraining said valve means against said impositive means; and means operated in accordance with the translation of said spindle for tripping said interference means for controlling succeeding positions of said valve means.

7. A continuous rotary machine tool combining a support; a head mounted for continuous rotation thereon; a plurality of members carried by said head and adapted to be each independently operated through a cycle of translatory movements; a fluid motor carried by said head for each of said members; a source of low pressure hydraulic fluid; a source of high pressure hydraulic fluid; means operated in timed relation to the rotation of said head for admitting said low pressure hydraulic fluid to each of said motors in succession; and means for individually controlling the subsequent admission of high pressure fluid to each of said motors in accordance with the movement of the respective member.

8. A machine tool combining a supporting column; a head rotatably mounted thereon; a machine element mounted on said head and adapted to be translated relative thereto; a fluid motor mounted on said head for causing translation of said element; a gear mounted on said column; cam means rotatively mounted on said head; a first gear stationarily mounted on said column; a second gear meshing therewith mounted to revolve with said head; connecting gearing between said first and second gearing whereby a relative rotation between said head and cam is produced by rotation of said head; and control means for said motor adapted to contact with said cam means as the head rotates.

In witness whereof, I hereunto subscribe my name.

ADOLPH L. DE LEEUW.